United States Patent [19]

Foley

[11] Patent Number: 5,450,130
[45] Date of Patent: Sep. 12, 1995

[54] METHOD AND SYSTEM FOR CELL BASED IMAGE DATA COMPRESSION

[75] Inventor: Peter F. Foley, Los Altos Hills, Calif.
[73] Assignee: Radius Inc., Sunnyvale, Calif.
[21] Appl. No.: 221,220
[22] Filed: Mar. 30, 1994
[51] Int. Cl.$^6$ ............................................. H04N 7/26
[52] U.S. Cl. .................................. 348/391; 348/717; 348/718
[58] Field of Search .................. 348/391, 717, 718; 382/56; H04N 7/13, 7/137

[56] References Cited

U.S. PATENT DOCUMENTS

| | | | |
|---|---|---|---|
| 4,663,660 | 5/1987 | Fedele et al. | 348/397 |
| 4,703,350 | 10/1987 | Hinman | 348/402 |
| 4,849,810 | 7/1989 | Ericsson | 348/416 |
| 4,855,825 | 8/1989 | Santamaki et al. | 348/415 |
| 5,150,209 | 9/1992 | Baker et al. | 348/407 |
| 5,155,594 | 10/1992 | Bernstein et al. | 348/411 |
| 5,164,819 | 11/1992 | Music | 348/420 |
| 5,179,651 | 1/1993 | Taaffe et al. | 395/154 |
| 5,237,397 | 8/1993 | Mighdoll | 348/391 |
| 5,319,793 | 6/1994 | Hancock | 395/800 |

FOREIGN PATENT DOCUMENTS

WO92/15986  9/1992  WIPO ................ G10L 5/00

OTHER PUBLICATIONS

Three-page document describing an XRAM frame buffer controller, believed to have been developed by Chips and Technologies, distributed at the Microsoft Windows TM Hardware Engineering Conference, held in Feb. 1994.

One-page specification sheet by Chips and Technologies, "64300/301 Wingine DGX DRAM Graphics Accelerator" (received Feb. 23-25, 1994).

*Primary Examiner*—Howard W. Britton
*Attorney, Agent, or Firm*—Limbach & Limbach

[57] ABSTRACT

A method and system for compressing color video or other image data for transmission over a low cost, low bandwidth bus (or other transmission link). Preferred embodiments implement lossless compression and include a frame buffer for storing data compressed in accordance with the invention, and circuitry for decompressing and transforming compressed data read from the frame buffer. The image data are typically organized as a sequence of frames, each comprising a sequence of pixels. Data compressed in accordance with the invention are stored in cells in memory, with each cell storing the same number of pixels. The inventive method is denoted as "cell based image compression" ("CBC"). Advantages of CBC include increasing available data transmission bandwidth and lowering required system power as a result of minimizing transfer of redundant color information to and from memory as well as fast random single pixel reads and writes. Some embodiments interface with a fast, narrow, single ported frame buffer, such as a RAMBUS or SDRAM memory, and compress image data not to minimize memory requirements, but to minimize bus bandwidth requirements for transferring data to and from memory. With this type of memory, all frame buffer accesses, such as host access, display refresh, and BLIT (Block Image Transfer) operations, compete on the same bus for frame buffer memory bandwidth. CBC allows frame buffers of acceptable BLIT performance whose available bandwidth is no more than slightly larger than the worst case bandwidth required to support display refresh (the worst case being no image compression). The amount of additional bandwidth available for BLIT operations and host access is variable, and depends on the compression rate of the data being transferred.

50 Claims, 7 Drawing Sheets

| APR | APG | APB | VD | VD | RPR | RPG | RPB | IVD | IVD | IVD | IVD |

APR: ANCHOR PIXEL RED COMPONENT
APG: ANCHOR PIXEL GREEN COMPONENT
APB: ANCHOR PIXEL BLUE COMPONENT
RPR: REFERENCE PIXEL RED COMPONENT
RPG: REFERENCE PIXEL GREEN COMPONENT
RPB: REFERENCE PIXEL BLUE COMPONENT
VD: VALID PIXEL DATA (COMPRESSED)
IVD: INVALID DATA

FIG. 3

(E) | X |   |   |      3 "BYTE" ANCHOR PIXEL (A) | 0X |   |   |     3 "BYTE" REFERENCE PIXEL (B) | 110X |   |       2 "BYTE" PIXEL (C) | 10X |            1 "BYTE" PIXEL (D) | 111X |           RUN LENGTH PIXEL (RLP)

( X = DON'T CARE )

FIG. 4

```
 8              0 8              0 8              0
┌─┬──────────┬─┬──────────────┬─┬──────────────┐
│0│   RED    │X│    GREEN     │X│    BLUE      │
└─┴──────────┴─┴──────────────┴─┴──────────────┘
```

RED     8 BIT VALUE
GREEN  8 BIT VALUE
BLUE    8 BIT VALUE
X        DON'T CARE

FIG. 5

```
 7            0 7              0 7              0
┌─┬──────────┬────────────────┬────────────────┐
│0│  BLUE    │     GREEN      │      RED       │
└─┴──────────┴────────────────┴────────────────┘
```

BLUE    7 BIT VALUE
GREEN  8 BIT VALUE
RED     8 BIT VALUE

FIG. 6

```
 8   5        1 0 8    5 4           0
┌─┬─┬─┬──────┬────────┬──────────────┐
│1│1│0│ dRED │ dGREEN │    dBLUE     │
└─┴─┴─┴──────┴────────┴──────────────┘
``` dRED    5 BIT RED OFFSET
dGREEN  5 BIT GREEN OFFSET
dBLUE   5 BIT BLUE OFFSET

FIG. 7

```
 7       4    1 0 7    4 3       0
|1 1 0| d BLUE |dGREEN | d RED   |
``` dBLUE   4 BIT BLUE OFFSET
dGREEN  5 BIT GREEN OFFSET
dRED    4 BIT RED OFFSET

FIG. 8

```
 8 6 5   4   2 1   0
|1|1| dR | dG | dB |
``` dR   2 BIT RED OFFSET
dG   3 BIT GREEN OFFSET
dB   2 BIT BLUE OFFSET

FIG. 9

```
 7 5  4 3  2 1   0
|1 1| dB | dG | dR |
``` dB   2 BIT BLUE OFFSET
dG   2 BIT GREEN OFFSET
dR   2 BIT RED OFFSET

FIG. 10

```
 8   5              0
|1|1 1| RUN LENGTH  |
```

FIG. 11

```
 7 5 4              0
|1 1 1| RUN LENGTH  |
```

FIG. 12

| 3 | 3 | 3 | 3 | 3 | 3 |
|---|---|---|---|---|---|
| 32,32,32 | 31,33,32 | 50,10,31 | 50,10,31 | 50,10,31 | 90,90,90 |

| 3 | 1 | 2 | 1 | 3 |
|---|---|---|---|---|
| 32,32,32 | −1,+1,0 | +19,−23,−1 | RLP 2 | 90,90,90 |

| | |
|---|---|
| R \| G \| B | 24 BIT ANCHOR PIXEL ( AP ) |
| 0 \| R \| G \| B | 25 BIT REFERENCE PIXEL ( RP ) |
| 10 \| RGB OFFSETS | 14 BIT PIXEL ( R,G,B = 4,4,4 ) |
| 110 \| RGB OFFSETS | 12 BIT PIXEL ( R,G,B = 3,3,3 ) |
| 1110 \| RGB OFFSETS | 19 BIT PIXEL ( R,G,B = 5,5,5 ) |
| 11110 \| RGB OFFS | 11 BIT PIXEL ( R,G,B = 2,2,2 ) |
| 11111 | 8 BIT RUN LENGTH PIXEL ( RLP ) (WITH 3 BIT PIXEL COUNT ) |
| | 3 BIT CELL FETCH SIZE |

METHOD AND SYSTEM FOR CELL BASED IMAGE DATA COMPRESSION

FIELD OF THE INVENTION

The invention pertains to a method and system for compressing image data, such as color video data, for transmission with low bandwidth. Preferred embodiments of the inventive system include a frame buffer memory, and means for compressing image data for transmission to and from the frame buffer memory with low bandwidth.

BACKGROUND OF THE INVENTION

Video is a critical part of many applications such as entertainment, communications, and training. In the past video data was represented exclusively in analog form which restricted the creation, storage, and distribution of video to systems dedicated only to analog video. It is now possible to process video digitally which has greatly lowered the cost of using and creating video, and has allowed video to be created, stored and transmitted by general purpose digital computer equipment. This way of working with video is far less expensive and more convenient than use of analog means and has enabled many new ways of using and working with video.

Unfortunately, raw digital video on a large true color display represents a digital data rate in excess of 300 million bytes per second of video. Storing and transmitting raw data at this rate is difficult except with very expensive equipment and high performance digital communication links. A wide range of techniques have been developed to compress digital video in order to reduce this data rate to one that is far more manageable. Each compression technique has advantages for different applications.

This specification will refer to several types of image data processing operations, including the following: a display refresh, a process which repetitively transfers every pixel to a display from a frame buffer memory (typically at a rate of 60 to 75 display refreshes per second); a host computer read (of the single pixel type), a process by which a host computer instructs a frame buffer system to read a single pixel from a frame buffer and transfer the pixel to the host computer; a host computer read (of the multiple pixel type), a process by which a host computer instructs a frame buffer system to read multiple pixels from a frame buffer and transfer the pixels to the host computer; a host computer write (of the single pixel type), a process by which a host computer writes a single pixel to a frame buffer; a host computer write (of the multiple pixel type), a process by which a host computer writes multiple pixels to a frame buffer; a raster operation (ROP), a process by which multiple pixels stored in a frame buffer are transformed, which typically requires reading of multiple pixels from the frame buffer, transformation of these pixels, and writing back the transrotator pixels to the frame buffer; and a pixel move, a process by which multiple pixels stored in a frame buffer are copied to other memory locations in the frame buffer (without being transformed).

Throughout this specification, the term "BLIT operations" is employed to denote host independent pixel moves and raster operations within a frame buffer memory system, and the term "Blitter" (or "BLITter") denotes the portion of the logic of the inventive frame buffer controller (e.g., frame buffer controller 4 of FIG. 1) responsible for BLIT operations.

One type of BLIT operation is a copy of a rectangular block of pixels from one location in a frame buffer to another. This operation is defined by the X,Y coordinates (Sx, Sy) of the upper left corner of the source block of pixels, the X,Y coordinates (Dx,Dy) of the upper left corner of the destination block, the width and height (Ws, Hs) of the source block, and the width (W) of the frame. It is a well-understood problem in the field to design means for performing this function completely within a graphics processor (e.g., within frame buffer controller 4 of FIG. 1) using only these parameters to define this specific type of BLIT operation.

SUMMARY OF THE INVENTION

The method and apparatus of the invention compresses color video data (or other image data) for transmission over a low cost, low bandwidth bus (or other transmission link). Preferred embodiments of the invention implement lossless compression, and include a frame buffer memory for storing the compressed data, and optionally also means for decompressing the compressed data read from the frame buffer, and transforming the decompressed data.

The input image data processed by the invention are typically organized as a sequence of pixels, with each pixel comprising one or more bytes. The data, after compression in accordance with the invention, are stored in "cells" in a memory, each cell storing N pixels (where N is an integer greater than one). In preferred embodiments, the first pixel in each cell is an uncompressed "anchor" pixel. Anchor pixels are unambiguously determined by their location in the memory. The inventive compression method is sometimes denoted herein as a "cell based image compression" or "CBC" method (or simply as "CBC"). CBC provides several advantages, including increasing the available transmission bandwidth in systems which embody CBC, lowering required system power as a result of minimizing transfer of redundant color information to and from memory, and allowing relatively fast random single pixel reads and writes.

Preferred embodiments include (or interface with) a fast, narrow, single ported frame buffer memory, such as a RAMBUS or Synchronous DRAM (SDRAM) memory, and exploit spatial color locality of the input image data by using simple differencing and run length encoding techniques to compress the data not for the purpose of minimizing memory requirements, but for minimizing bus bandwidth requirements for transferring the compressed image data to and from the memory. With this type of memory, all frame buffer accesses, such as host access, display refresh, and BLIT operations, compete on the same bus for frame buffer memory bandwidth. This is more restricted than with traditional VRAM based frame buffer memories, in which the memory is dual ported and display refresh is supported through a separate serial I/O (SIO) interface that does not interfere with BLIT access or access by a host computer. CBC allows use of a single ported frame buffer whose available bandwidth to memory is equal to (or just slightly larger than) the worst case bandwidth required to support display refresh (the worst case being no image compression). The amount of additional bandwidth available for BLIT operations and host access is variable, and is dependent on the compression rate of the data being transferred to and from memory.

In a preferred embodiment, the invention implements lossless compression of image data, and interfaces with a frame buffer comprised of two 1M×16 bit SDRAM circuits, and with a small cache memory (which can be an SRAM circuit). The data are written to and read from the frame buffer over a bus having 32-bit width. The memory is organized in cells, each cell consisting of 48 bytes (8 bits per byte), and each cell having capacity to store 16 pixels compressed in accordance with the invention (including tag bits) or 16 unencoded, uncompressed pixels. If this embodiment of the invention determines that a sequence of 16 pixels cannot be encoded in accordance with the invention in a manner so that the encoded pixels will fit in a single cell of the frame buffer, it does not encode the pixels and instead stores all 16 of them in unencoded, uncompressed form in one cell in the frame buffer. In this case, no tag bits are stored in such cell of the frame buffer, but one or more corresponding tag bits are stored in the cache memory to identify the cell as one consisting of uncompressed data.

CBC allows, for the same bus width to memory, the design of a SDRAM based frame buffer that competes favorably in performance with other higher performance systems, such as RAMBUS based systems.

In preferred embodiments for compressing image data for transfer to a fast single ported memory, the power reduction improvements provided by the invention can be understood by considering the following. Most images, whether operating system desktops or photographic images, exhibit a high degree of spatial color locality in the sense that any pixel on the screen is highly likely to be similar in color to its neighbors. CBC exploits spatial color locality in only one dimension, the horizontal or scanline direction, as opposed to two dimensional compression schemes such as JPEG. Conventional frame buffer architectures typically encode each and every pixel in memory with full precision. This allows fast random access to individual pixel color information, but it is wasteful of system bandwidth when the pixel information is transferred over the memory bus. This is especially evident for display refresh operations. For typical conventional frame buffer systems, most of this color information is redundant, and so the excess power used to transmit the redundant color information across the bus is unnecessary. By compressing the pixel color information stored in the frame buffer, CBC reduces the amount of redundant information transmitted over the bus, thereby reducing system power.

BRIEF DESCRIPTION OF THE DRAWINGS

FIG. 3 is a diagram of a "cell" of memory locations for storing image data processed by a preferred embodiment of the invention.

FIG. 4 is a diagram of the format of a pixel encoded by each of four different encoding schemes in accordance with a preferred embodiment of the invention.

FIG. 5 is a diagram of the format of a pixel encoded by a first encoding scheme in a preferred embodiment of the invention.

FIG. 6 is a diagram of the format of a pixel encoded by a first encoding scheme in an alternative embodiment of the invention.

FIG. 7 is a diagram of the format of a pixel encoded by a second encoding scheme in a preferred embodiment of the invention.

FIG. 8 is a diagram of the format of a pixel encoded by a second encoding scheme in an alternative embodiment of the invention.

FIG. 9 is a diagram of the format of a pixel encoded by a third encoding scheme in a preferred embodiment of the invention.

FIG. 10 is a diagram of the format of a pixel encoded by a third encoding scheme in an alternative embodiment of the invention.

FIG. 11 is a diagram of the format of a pixel encoded by a fourth encoding scheme in a preferred embodiment of the invention.

FIG. 12 is a diagram of the format of a pixel encoded by a fourth encoding scheme in an alternative embodiment of the invention.

FIG. 17 shows the format of a pixel encoded by each of seven different encoding types, and the format of a three bit "cell fetch size" field inserted by the frame buffer controller (in a data stream to be written to the frame buffer memory) immediately after each anchor pixel.

DETAILED DESCRIPTION OF THE PREFERRED EMBODIMENTS

Key aspects of frame buffer systems embodying the invention ("CBC based frame buffer systems") include use of fast, narrow, single ported memory technology (which provides narrow data width and high speed) to allow a CBC based frame buffer system to have small data fetch granularity (the frame buffer data interface is a small number of bytes wide), and use of tag bits to mark various pixel type encodings within each "cell" of a selected number of pixels.

The tag bits can be implemented in a variety of ways, including:

inclusion of an extra bit for every standard byte having eight bit width in frame buffer memory. Use of a 9-bit wide memory (for storing 9 bit bytes) of this type, such as a RAMBUS RDRAM memory, allows implementation of tagging "for free" (in the sense that 3 tag bits can be stored with each 24 bit full precision pixel without overflowing the cell); and encoding the tag bits directly in the pixel data stream of a standard "8 bits per byte" frame buffer architecture. In this latter implementation, if one bit of true color accuracy is sacrificed (e.g., if the frame buffer system stores 23-bit color pixels rather than 24-bit color pixels), then CBC can be implemented in a standard 8 bits/byte frame buffer without the use of an additional cache memory (this encoding is described in more detail below).

Since image data are typically most efficiently fetched in bursts or blocks (collectively referred to herein as "bursts"), systems which embody the invention preferably include means for early termination of burst transfers (read or write). Best results are obtained if the bursts can be terminated at the granularity of a single fetch item (e.g., if a byte wide memory is used, the system desirably can terminate a burst at Any byte being transferred).

The importance of fine data burst read/write termination granularity is analogous to the importance of the fine data fetch granularity afforded by a narrow data path, and both are important to capitalize on the variable amount of pixel data compression in the inventive cell of image data. The larger the fetch granularity, the larger the cell size must be to amortize the cost of the large granularity, but this increases the search cost associated with single pixel reads and writes.

Figure 1:
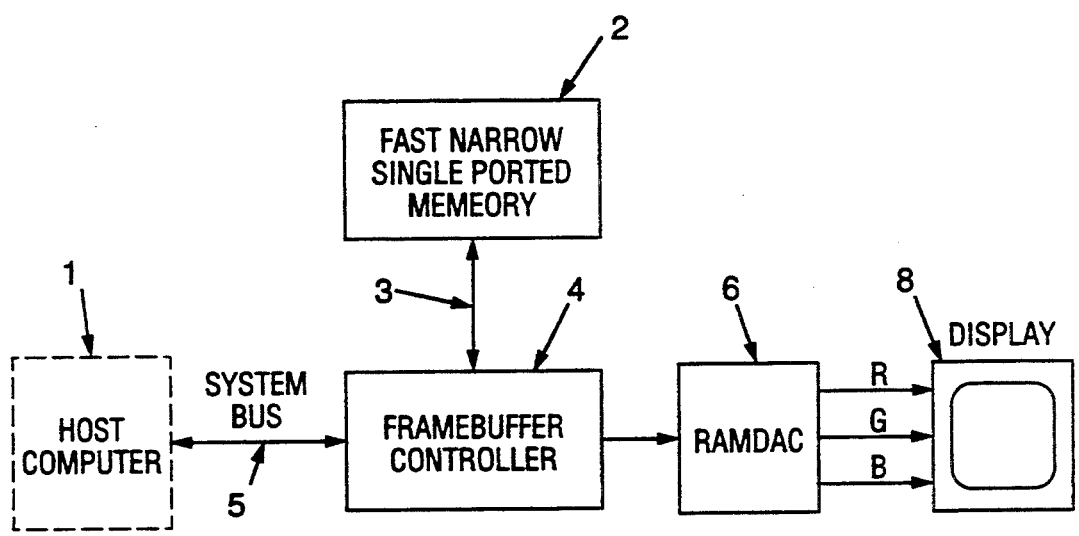
FIG. 1 is a block diagram of a system which can embody the invention.

FIG. 1 is a block diagram of a frame buffer system which can embody the invention. The FIG. 1 system includes frame buffer controller 4, which can receive raw (uncompressed) digital color video data from a host computer 1 (or a video source controlled by host computer 1) over system bus 5, compress the video data, and transfer the compressed video into memory 2 (which is a fast narrow single ported memory) over narrow bus 3. Host computer 1 is shown in phantom view because the inventive system need not include a host computer. Frame buffer controller 4 can also read compressed digital video from memory 2, decompress the compressed digital video (received from memory 2 over narrow bus 3), and transfer the decompressed digital video to RAMDAC 6. RAMDAC 6 can convert the decompressed digital video to analog RGB video, and can transfer the red (R), green (G), and blue (B) channels of analog RGB video to display device 8 for display. Although RAMDAC 6 is shown as a separate component, it can alternatively be implemented as part of frame buffer controller 4.

In typical operation, pixels of video data are encoded on system bus 5 in full precision format. Frame buffer controller 4 compresses the data on their way into frame buffer memory 2 for writes by host computer 1. For reads by host computer 1, frame buffer controller 4 decompresses the pixels of video data from frame buffer memory 2 on their way to host computer 1 over system bus 5.

For raster operations controlled by the FIG. 1 system, compressed pixels are read into frame buffer controller 4 from frame buffer memory 2, and the pixels are decompressed into full precision format in frame buffer controller 4. Pixels can also be compressed in frame buffer controller 4 as they are written into frame buffer memory 2.

For simple moves of many pixels that do not change the values of the pixels read from memory 2 (e.g., reads of many cells of pixels from memory 2, and writes of the pixels back to different storage locations in memory 2, where "cell" is defined below), frame buffer controller 4 need not decompress cells other than the beginning and ending cell of the spart of cells moved (and need not compress such intermediate cells before writing them back to memory 2). This technique will save power in frame buffer controller 4.

For illustrative purposes, consider the case that the FIG. 1 system is a true color frame buffer system in which each pixel is nominally 3 bytes in width, where the width of bus 3 (the data path width to frame buffer memory 2) is one byte. With reference to FIGS. 4–12 below, the following two implementations of the tag bit identification of each pixel processed by the invention are considered; one implementation in which each byte is actually 9 bits in width (such as in a RDRAM, and perhaps an NEC 2M×9 SDRAM and an NEC 1M×18 SDRAM as well); and another in which the tag bit for each pixel is implemented in the pixel data stream by sacrificing one bit of color accuracy in the Blue color component channel. The latter 23-bit color case allows CBC to be implemented in existing 8 bit/byte frame buffer architectures without the use of an additional cache memory.

When employing the FIG. 1 system to implement the invention, memory 2 is organized into "cells," where each cell is a group of pixels. The first pixel in each cell is a special 3 byte pixel known as an "anchor pixel." The term "reference pixel" is used herein to denote any 3 byte pixel (including an anchor pixel). The value (color) of any pixel following a reference pixel is typically encoded in a manner dependent on the reference pixel as a starting value.

Each cell uses 3N bytes of frame buffer memory 2 (where N is the number of pixels per cell), although the data content of each cell will typically reside in a smaller number of bytes of memory 2 depending on the amount of compression achieved in the cell.

FIG. 3 is an example of a cell consisting of four pixels. The pixels of the cell are encoded in accordance with the invention in a way that achieves 33% compression. The first three bytes of the cell determine an (uncompressed) anchor pixel (FIG. 3 identifies the red, green, and blue color components of the anchor pixel as "APR," "APG," and "APB," respectively). The next two bytes of the cell are two compressed pixels. The next three bytes of the cell are a fourth (uncompressed reference) pixel (FIG. 3 identifies the red, green, and blue color components of the reference pixel as "RPR," "RPG," and "RPB," respectively). The final four bytes of the cell are not used (they are identified in FIG. 3 as "IVD" which denotes "invalid data"). The unused capacity of frame buffer memory 2 (corresponding to the unused bytes toward the end of each cell, which result from compression in accordance with the invention) exists to allow a worst case image (consisting entirely of uncompressed pixels) to fit into frame buffer memory 2.

When employing the FIG. 1 system to implement the invention, pixel data within the cells, and the cells themselves are linearly ordered in frame buffer memory 2 in scanline order. Although this ordering is not strictly necessary it is strongly preferred (for implementing display refresh operations, as described below).

Organizing frame buffer memory 2 into cells is key to CBC, since it minimizes the search penalty to find and-/or modify single pixels.

An important aspect of the invention is to compress pixels by encoding each pixel of each cell in accordance with a selected one of two or more encoding schemes, such as the encoding schemes having the four formats shown in FIG. 4. FIG. 4 shows byte aligned encoding formats.

As shown in FIG. 4, preferred embodiments of the invention encode the most significant bit (MSB) of the first byte of each non-anchor pixel as a tag bit. Additional bits of the first byte of each non-anchor pixel are sometimes also encoded as tag bits. The encoding of each anchor pixel (e.g., pixel "E" in FIG. 4) is unambiguously determined by the physical location in memory of each anchor pixel (e.g., the first X bits of each cell in memory are assumed to be an anchor pixel). If the MSB of the first byte is "0" (as in the pixel labeled "A" in FIG. 4), then the pixel is an uncompressed, true color, three byte pixel (sometimes referred to as a "reference pixel"). If the MSB is "1" (as in each of the pixels labeled "B," "C," and "D" in FIG. 4) then the next one or two bits are tag bits which determine the type of encoding employed to compress the pixel. If the bit after the MSB is a "0" (as in the pixel labeled "C" in FIG. 4), the pixel is a compressed 1 byte pixel. If the next two bits after the MSB are "10" (as in the pixel labeled "B" in FIG. 4) then the pixel is a compressed 2 byte pixel. If the next two bits after the MSB are "11" (as in the pixel labeled "D" in FIG. 4), then the pixel is a compressed 1 byte Run Length Pixel. These pixel formats are explained in detail below with reference to FIGS. 5–12.

As mentioned above, the tag bits of the invention can be encoded directly in a stream of standard "8 bits per byte" pixels (typically consisting of three bytes per pixel), or in a stream of "9 bits per byte" pixels (also typically consisting of three bytes per pixel).

In the 9-bit per byte format shown in FIG. 5, a reference pixel is a standard 24-bit true color pixel which encodes 16 million colors, plus a tag bit (having the value "0") in the MSB position, plus two unused bits (the first bit of each of the green and blue color components of the pixel).

In the 8-bit per byte format shown in FIG. 6, one bit of the reference pixel's blue color component is sacrificed (replaced by a tag bit) without adding any additional memory requirement. The 23-bit reference pixel of FIG. 6 is an "almost true color" pixel which can encode any of approximately 8 million colors.

With reference to FIGS. 7 and 8, a "2-byte compressed pixel" encoding will next be described. Each pixel having this encoding consists of offset values which are 2's complement numbers, and which represent the difference between each color component of the pixel and the corresponding color component of the previous pixel. In the 9 bit per byte format shown in FIG. 7, any of the three RGB color components (base colors) of the 2-byte encoded pixel can differ from that of the preceding pixel by up to +15 or −16. A good way think of this is to imagine the previous pixel in the center of a cube in three dimensional RGB color space. The compressed pixel (of FIG. 7) can then be any pixel in that cube of 32*32*32=32768 colors centered around the previous pixel.

In the 8 bit per byte format of FIG. 8 (in which the first three bits of the 2 byte compressed pixel are tag bits), the other bits of the compressed pixel consist of four bits determining a blue offset value, five bits determining a green offset value, and four bits determining a red offset value. Thus, the compressed pixel can be any pixel in a smaller cube of 16*32*16=8192 colors centered around the previous pixel.

With reference to FIGS. 9 and 10, a "one-byte compressed pixel" encoding will next be described. A pixel having this encoding consists of offset values which represent the difference between each color component of the pixel and the corresponding color component of the previous pixel. In the 9 bit per byte format shown in FIG. 9 (in which the first two bits of the pixel are tag bits), the other bits of the one-byte compressed pixel consist of two bits determining a blue (B) offset value, three bits determining a green (G) offset value, and two bits determining a red (R) offset value. Thus, the R and B color components of the encoded pixel can differ from those of the preceding pixel by +1, 0, −1, or −2, and the green (G) color component can differ by +3, +2, +1, 0, −1, −2, −3, or −4 from the green color component of the preceding pixel. A good way to think of this is to imagine the previous pixel in the center of a cube in three dimensional RGB color space. A compressed pixel (encoded in the FIG. 9 format) can then be any pixel in that cube of 4*8*4=128 colors centered around the previous pixel.

In the 8 bit per byte format of FIG. 10 (in which the first two bits of the pixel are tag bits), the other bits of the one-byte compressed pixel consist of two bits determining a blue offset value, two bits determining a green offset value, and two bits determining a red offset value. Thus, the compressed pixel of FIG. 10 can be any pixel in a smaller cube of 4*4*4=64 colors centered around the previous pixel.

Finally, a fourth pixel encoding format will be described with reference to FIGS. 11 and 12. This encoding is useful for long rims of identical color pixels, such as solid color regions or fills, or for the desktops found in typical windowed operating systems.

In the 9 bit per byte format of FIG. 11, the three initial tag bits (having values "111") indicate that the following number ("RUN LENGTH") of pixels have the same value as the previous pixel. Since RUN LENGTH is determined by six bits, RUN LENGTH can have any value from zero to 63. This 6 bit run length indicates that a natural maximum cell size for the encoding format of FIG. 11 would be 64 pixels. Maximum CBC compression for this encoding varies from 3:1 for 4 pixel cells, to 48:1 for 64 pixel cells.

In the 8 bit per byte format of FIG. 12, the three initial tag bits (having values "111") indicate that the following number ("RUN LENGTH") of pixels have the same value as the previous pixel. Since RUN LENGTH is determined by five bits, RUN LENGTH can have any value from zero to 31. This 5 bit run length indicates that a natural maximum cell size for the encoding format of FIG. 12 would be 32 pixels. Maximum CBC compression for this encoding varies from 3:1 for 4 pixel cells, to 24:1 for 32 pixel cells.

Note that since a first data access, in a burst access of frame buffer memory in accordance with the invention, typically takes longer than subsequent accesses, the reduction in bandwidth required to transfer the cell as a result of employing the encoding formats of FIGS. 7–12 (to encode pixels within a cell) is less than the amount of pixel data compression in the cell. Further, the data fetch granularity of the databus interface to the frame buffer memory may be wider than the smallest encoded pixel type. This may further reduce the effective compression.

In cases in which pixel data bits are not sacrificed to create room for tag bits (such as in the "9 bits per byte" encodings of FIGS. 7, 9, and 11), CBC is a lossless compression algorithm.

It may be difficult for frame buffer controller 4 of the invention to watch for tag bits on the fly and quickly terminate a burst read (e.g., when a cell is completely read) with a very high speed interface to memory 2 (such as a RAMBUS interface, which has a 2.5 ns/pixel burst data rate). For this kind of system it may be more advantageous to explicitly encode the compressed cell size in the cell data to provide early indication to the frame buffer controller as to when to terminate the burst read. An example of this technique is to allocate the byte after the anchor pixel to contain always a cell valid data byte count.

Figures 13, 14, 15:
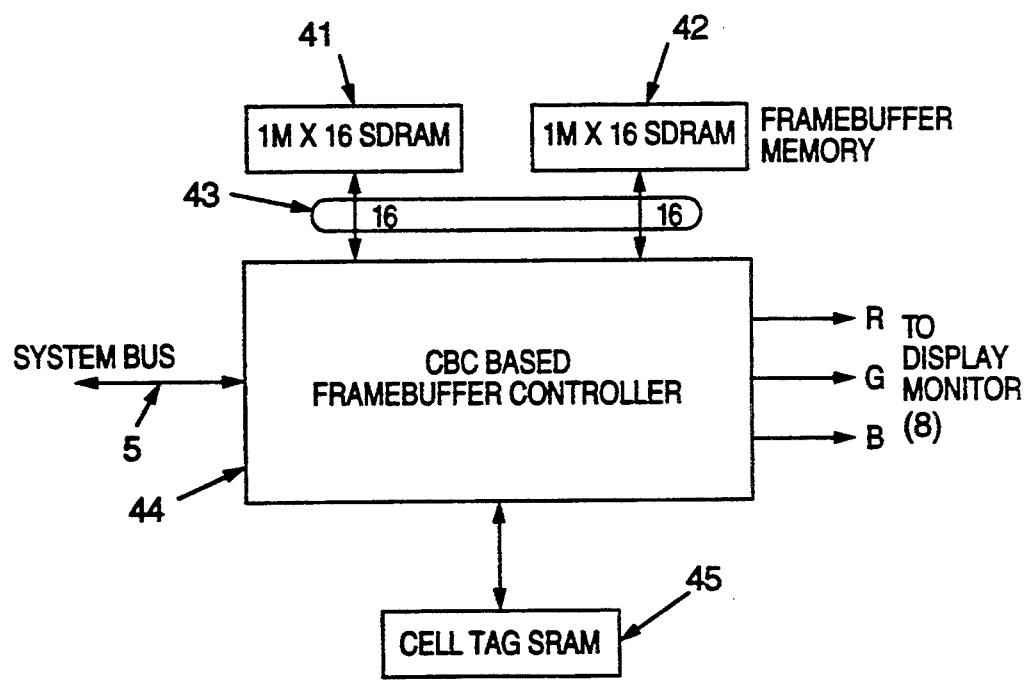
FIG. 13 is a diagram of six unencoded (uncompressed) pixels.
FIG. 14 is a diagram of the pixels of FIG. 13, after they have been encoded in accordance with an embodiment of the invention.
FIG. 15 is a block diagram of a preferred embodiment of the system of the invention.

Next, with reference to FIGS. 13 and 14, we provide an example of compression of a cell of pixels in accordance with the invention.

FIG. 13 represents a cell of six true color pixels, with the values of the red (R), green (G), and blue (B) color components of each pixel shown within the box representing that pixel. The first pixel in the cell of FIG. 13 is an anchor pixel whose R, G, and B color component values are 32, 32, and 32, respectively. FIG. 14 represents a compressed version of the pixels of FIG. 13, after these six pixels have been compressed in accordance with an embodiment of the invention. For simplicity, FIGS. 13 and 14 show the values of the color components in decimal form, and show the number of bytes used by each pixel above the box representing the pixel.

It is apparent by comparing FIGS. 13 and 14 that the compression operation leaves the anchor pixel unchanged (uncompressed). Since the second pixel's RGB components have values (31, 33, and 32) which differ from those of the anchor pixel by only small amounts, the second pixel is compressed in accordance with the scheme of FIG. 9 (or 10) so that the compressed version has one byte size (as shown in FIG. 14).

The RGB component values of the third pixel (50, 10, and 31) differ from those of the second pixel by too much to be encoded in accordance with the scheme of FIG. 9 or 10 (so that the compressed version of the third pixel must have size greater than one byte). However, the RGB values of the third pixel are sufficiently similar to those of the second pixel to enable compression of the third pixel in accordance with the scheme of FIG. 7 (or 8) so that the compressed pixel has two byte size (as shown in FIG. 14).

Still with reference to FIGS. 13 and 14, the fourth and fifth pixels are identical to the third pixel, so they can be encoded as a "Run Length" of two (in accordance with the scheme of FIG. 11 or 12). The sixth pixel differs too much from its predecessor to be encoded in any format other than as a 3 byte reference pixel (thus the sixth pixel in FIG. 14 is not compressed and is identical to the sixth pixel of FIG. 13).

Figure 2:
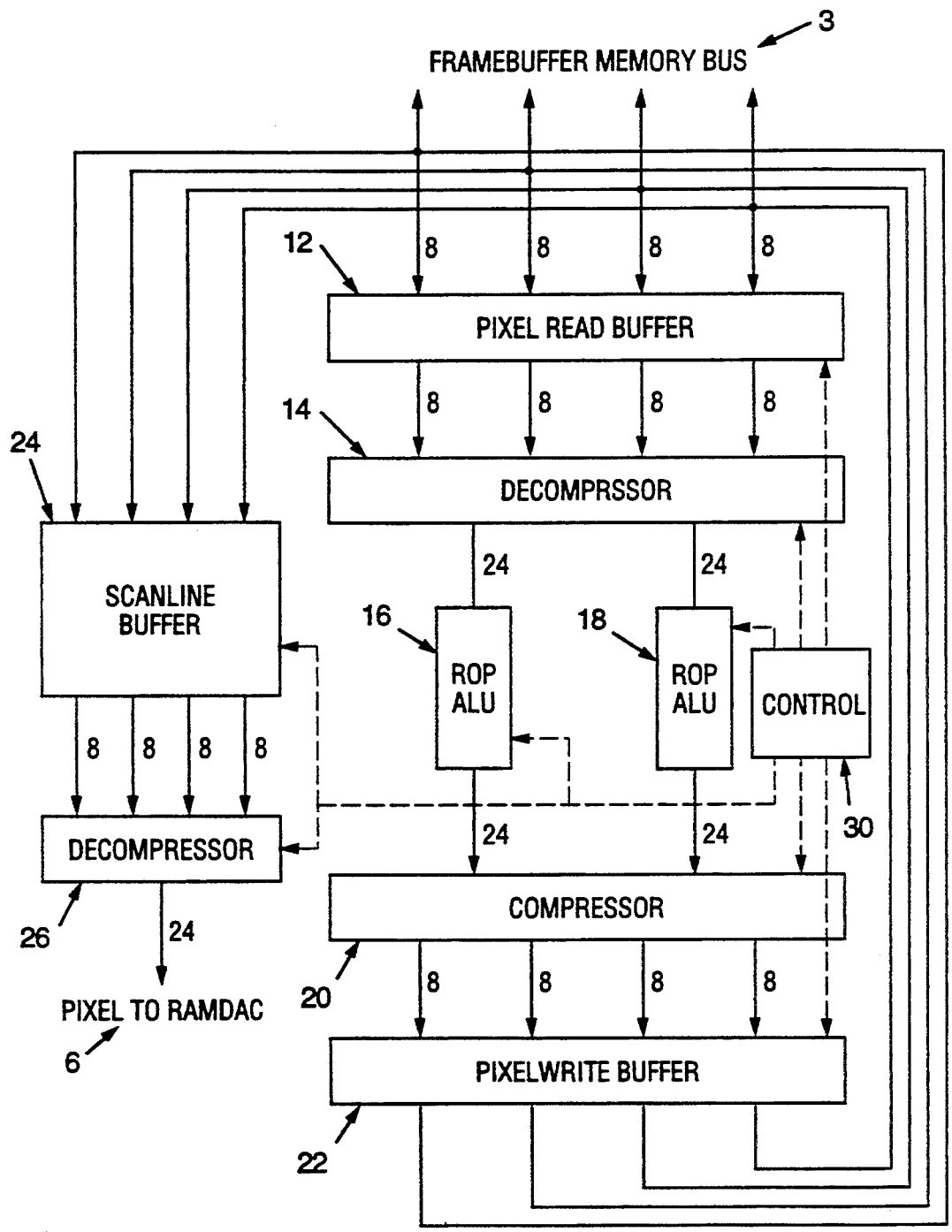
FIG. 2 is a block diagram of the frame buffer controller of FIG. 1 in a preferred embodiment of the invention.

With reference to FIG. 2, principal elements of a preferred embodiment of frame buffer controller 4 of FIG. 1 (and several modes of operation thereof) will next be described. The FIG. 2 circuitry interfaces with a Synchronous DRAM-based implementation of frame buffer 2 (shown in FIG. 1) over bus 3. Bus 3 has a width of four bytes (each byte consists of eight bits). The internal components of FIG. 2 (circuits 12, 14, 16, 18, 20, 22, 24, 26, and 30) are clocked at twice the peak frame buffer memory fetch rate. The arithmetic logic hardware (ALU) for performing BLIT operations (including raster operations) is duplicated, in the sense that a first ALU 16 is connected in parallel with an identical ALU 18 between decompression circuit 14 and compression circuit 20. This allows ALUs 16 and 18 (the principal components of FIG. 2's "Blitter" subsystem) to process four pixels per fetch time of memory 2. Thus, for Synchronous DRAM implementation of memory 2, with a realizable burst speed of 80 MHZ, the internal logic of FIG. 2 should be clocked at 160 MHZ.

Control circuitry 30, which is typically interfaced (by means not shown in FIG. 2) to a system bus such as system bus 5 of FIG. 1, provides control signals to elements 12, 14, 16, 18, 20, 22, 24, and 26 of the FIG. 2 system as needed to enable the FIG. 2 system to perform the operations described herein.

To perform BLIT operations, compressed pixels are read from memory 2 into pixel buffer 12, and decompressor 14 receives the compressed pixels from pixel buffer 12 and decompresses them. ALUs 16 and 18 then perform any necessary transformations on the decompressed pixels. Decompressor 14 outputs full precision pixels (two streams of decompressed 24-bit pixels) at four times the peak data fetch rate from frame buffer memory 2. This means that since the ALU resources are doubled, decompressor 14 should be clocked at twice the peak fetch rate of frame buffer memory bus 3.

After undergoing processing in ALU 16 (or ALU 18), the processed full precision pixels pass through compression circuit 20 ("compressor" 20). The compressed pixels output from compressor 20 are versions of the pixels received by compressor 20 that have been compressed in accordance with the invention, and are written into pixel write buffer 22.

For display refresh operations, the FIG. 2 circuitry reads compressed pixels into scanline buffer 24 from bus 3. These compressed format pixels (which have been compressed in accordance with the invention) are then decompressed in decompression circuit 26 (decompressor 26). The full precision pixels (decompressed 24-bit pixels) output from decompressor 26 are transferred to RAMDAC 6 (shown in FIG. 1). RAMDAC 6 includes digital-to-analog conversion means. Digital video (typically RGB video) are transferred to the RAMDAC 6, converted to analog video (typically RGB video) in the D-to-A converter within RAMDAC 6, and displayed on display device 8 (typically a CRT display device) shown in FIG. 1.

Note that some parallelism is possible in the FIG. 2 architecture since whenever the display refresh logic preemptively takes control of bus 3, the Blitter logic (elements 12, 14, 16, 18, 20, and 22) may continue to run until the contents of pixel read buffer 12 are exhausted, or until pixel write buffer 22 is full.

All pixel buffering (to pixel read buffer 12, to pixel write buffer 22, and to scanline buffer 24) is done with the pixels in compressed format. This increases the effective size of the buffers, allowing yet more efficient use of the bandwidth of frame buffer memory bus 3 since larger or contiguous burst transfers can be used.

FIG. 2 is preferably implemented in hardware, but can attentively be implemented in software (by an appropriately programmed general purpose digital computer system). Such computer should include means for writing compressed image data over bus 3 to a fast narrow single ported memory (such as memory 2) and for reading compressed image data over bus 3 from the memory.

The effects and performance of a CBC frame buffer system (e.g., a version of FIG. 1 which embodies the invention) are different depending on the operation being performed. Some of these different cases are outlined below.

Display Refresh:

When performing display refresh operations, CBC virtually always reduces the transmission bandwidth required for reading pixels from a frame buffer (assuming the pixels stored in the frame buffer have been compressed in accordance with the invention). At the very worst, the bandwidth required is the same as if the stored pixels were not compressed. Pixel data are read into the inventive frame buffer controller (e.g., element 4 of FIG. 1) using burst reads starting at an anchor pixel, and are then decompressed or "expartded" (e.g., within decompressor 26 of FIG. 2) prior to being presented to a RAMDAC (e.g., RAMDAC 6 of FIG. 1). Whenever the frame buffer controller encounters a reference pixel, it (e.g., its decompressor 26) determines the full precision value of the compressed pixel following the reference pixel using the reference pixel as a basis offset by the encoded offset values contained in the compressed pixel. This new full precision value serves as the basis value for computation of the next compressed pixel's full precision value. This procedure continues until the next reference pixel (within the same cell) is encountered, or until the number of pixels contained in a cell has been read in, at which time the burst read is either terminated, or continued at a new anchor pixel address such that the invalid data at the end of the cell are skipped. For example, if the memory stores the pixels in cells, with each cell consisting of eight pixels, the maximum compression realizable is 6×(4 bytes read vs. 24 bytes).

Since a conventional single port frame buffer memory (which may be used to implement memory 2) typically expends greater than 50% of available bandwidth on display refresh, the potential savings offered by CBC in reduction of display refresh bandwidth requirements alone are considerable.

Host CPU Read (single pixel):

Single pixel reads by a host (e.g., host computer 1 of FIG. 1) are accomplished by the inventive frame buffer controller (e.g., frame buffer controller 4) as follows. The frame buffer controller initiates a burst read starting at the anchor pixel closest to (but preceding) the desired pixel, and reconstructs the full precision values of each pixel in the cell as the compressed pixel data are read in until the desired pixel is reached, at which time the burst read is terminated and the full precision color value of the desired pixel is returned to the host.

Single pixel reads using CBC are not as fast as conventional single pixel reads, unless the pixel desired happens to be an anchor pixel. The penalty involved depends on the location of the desired pixel in a cell, the amount of compression, and the cell size. The cell size and amount of compression determine how much "walking" on average through the cell has to be done to obtain the pixel desired.

Host CPU Read (multiple pixel):

Multiple pixel reads that spart multiple cells by a host computer are accomplished by the inventive frame buffer controller (e.g., frame buffer controller 4) as follows. The frame buffer controller initiates burst reads starting at the anchor pixel closest to (but preceding) the desired pixel, and reconstructs the full precision values of each pixel in the cell as the pixels are read in, until the desired start pixel is reached. From then on, it continues to reconstruct the full precision values of the pixels being read in, and returns the full precision pixel values to the host with new burst reads as necessary being performed, until the final pixel is reached, at which time the burst read is terminated and the final full precision value is returned to the host.

Whether multiple pixel reads in accordance with CBC use less bandwidth (are read faster) than conventional multiple pixel reads depends on the number of pixels read, the amount of compression in the cells, and the cell length. A greater number of pixels read in accordance with CBC results in a smaller bandwidth penalty. If the read sparts multiple cells, the only places where performance penalties can occur are in the beginning cell. The read of the remaining cells (the cells other than the beginning cell) occurs at full compressed data read speed.

Host CPU Write (single pixel):

Single pixel writes by a host computer (in accordance with CBC) are more complex than conventional single pixel writes by a host computer because they must be preceded by a burst read of the frame buffer (unless the pixel to be written into the frame buffer happens to be an anchor pixel) by the inventive frame buffer controller in order to determine:

(1) the physical position in the cell of the pixel to be written;
(2) the full precision value of the pixel to be replaced;
(3) the compression encoding of the pixel to be written;
(4) the encodings of the pixels in the cell following the pixel to be written.

To accomplish this, the data from the host which is to be written (the host write data) are preferably held in a dump and run buffer in the frame buffer controller and acknowledged to the host while the burst read to the frame buffer memory is initiated.

Once the compression encoding of the pixel to be written is determined, what is done next depends on the full precision value of the pixel to be replaced:

(1) if the full precision value of the new pixel (to be written) is identical to the current pixel (to be replaced), no writeback need be performed. This is a rare event; or
(2) if the full precision value of the new pixel is not identical to the current pixel (to be replaced), then the burst read of the cell is finished, and all the pixels of the cell from the pixel to be written through the last pixel of the cell are burst written to the frame buffer memory with new encodings.

Single pixel writes thus pay the heaviest relative penalty in CBC, because a single write (W) is implemented as a read-modify-write (RMW), usually of multiple pixels. The penalty to be paid depends on the location in the cell of the pixel to be replaced, the compression seen during the burst read of the cell, the compression of the pixels burst written to the cell, and the cell size.

Host CPU Write (multiple pixel):

Multiple pixel writes by a host computer that spart multiple cells (in accordance with CBC) are more complex than conventional writes of this type, because they must be preceded by burst reads of the frame buffer by the frame buffer controller for the first and last cells written. The only exceptions to this are: if the first pixel written is an anchor pixel, then the burst read of the first cell can be avoided; and if the last pixel written is the last pixel in a cell, then the burst read of the last cell can be avoided.

As with single pixel host writes, the host write data are preferably held in a dump and run buffer in the frame buffer controller and acknowledged to the host while the burst read(s) to the frame buffer memory are initiated.

For pixels in the first cell to be written (once the compression encoding of each pixel to be written has been determined), what is done next depends on the full precision value of the pixel to be replaced:

(1) if the full precision value of each pixel to be written is identical to that of each corresponding pixel to be replaced, no writeback need be performed. This is a rare event;

(2) if the full precision value of a new pixel (to be written) is not identical to the current pixel at that location, then the burst read of the cell is terminated, and all pixels of the cell from the first pixel to be written to the last pixel in the cell are burst written with the new pixel data (which has been compressed on the way into the frame buffer).

For pixels in the center cells (not in the first or last cell), burst reads are unnecessary. The cells are directly written with the new pixel data (which has been compressed on the way into the frame buffer).

Unless the number of pixels to be written into the last cell equals the number of pixels per cell, a burst read of all pixels of the last cell must be completed in order to determine the new encodings for the pixels in the cell which follow the last host data write location.

A greater number of pixels written in accordance with CBC results in a smaller bandwidth penalty. If the write sparts multiple cells, the only places where performance penalties (RMW) can occur are in the beginning and ending cells. The writes to the intermediate cells (the cells other than the beginning and ending cells) occur at full compressed data write speed.

Blitter ROPs (RMW):

Raster operations (ROPs) are treated by CBC as multiple pixel (multiple cell), in place, read-modify-Write (RMW) operations by the inventive frame buffer controller. They are accomplished in substantially the same way as a multiple pixel host read followed by a multiple pixel host write as explained above. For "in place" ROPs, the burst read of the first cell during the multiple pixel write operation need not be repeated, so the full precision value of the pixel immediately before the first pixel to be written back is retained by the frame buffer controller.

Blitter Moves (RW):

Blitter moves in accordance with CBC are treated as multiple pixel (multiple cell) moves from one region to another in the frame buffer by the frame buffer controller. They are accomplished in substantially the same way as a multiple pixel host read followed by a multiple pixel host write, as explained above.

Simple moves of large numbers of cells allow an optimization whereby cells other than the beginning and ending cells need not be decompressed and then compressed prior to being written back. This technique saves power in the frame buffer controller.

Other operations:

Other operations, such as moving only a few pixels, or performing BLIT operations on only a few pixels are not explained in detail, but the manner in which they can be performed in accordance with CBC will be apparent to those of ordinary skill in the art from the operations explained above.

Next, several hardware considerations in designing embodiments of the inventive system will be discussed. Not only does compression of image data in accordance with the invention make more bandwidth available to the Blitter of the inventive frame buffer controller (e.g., elements 12–22 of FIG. 2) because it reduces the bandwidth needed for display refresh operations, but the BLIT bandwidth itself is increased. This requires commensurate increases in the Blitter hardware resources if the BLIT bandwidth increase is to be fully taken advantage of.

For example, in a conventional SDRAM system with a three byte wide frame buffer memory datapath, the Blitter has one memory cycle time in which to process a pixel, because it requires only one clock cycle to read in a single 3 byte pixel. In contrast, with the inventive CBC system (ignoring RLP encoding as described with reference to FIGS. 11 and 12), three pixels can arrive in the same time period (if each is compressed to occupy only one byte), necessitating the processing of three pixels in the same amount of time if the preformance improvement offered by CBC is to be fully exploited.

In general, to more fully exploit the advantages of CBC for 24 bit true color systems (in which each pixel consists of three 8-bit color components) for embodiments that have a one-byte encoding, the Blitter hardware resources should increase threefold ($3\times$) for systems with frame buffer memory interfaces having width not greater than three bytes, and they should increase by a factor of $3+n$, where n is the number of bytes of the frame buffer memory interface in excess of three. The Blitter hardware resources can be increased either by increasing its internal data processing speed (clock speed) and time division multiplexing the hardware resources, or by duplicating the Blit hardware.

Additional powerful features of the inventive CBC method are that it enables adaptive change of the frame buffer cell size on the fly to optimally suit the work or image environment, and that it enables CBC application and cell size to be made region based. These features are further explained in the following three paragraphs.

If the user enters an application where single pixel operations (or operations on small numbers of pixels) are relatively infrequent, the frame buffer controller can be commanded to increase the cell size (or programmed automatically to increase the cell size) during a sweep through the frame buffer memory requiring only a fraction of a second (typically about one frame time).

In some embodiments of the invention, a table can be kept (in a memory in the frame buffer controller) of screen regions for which different cell sizes are used (CBC can even be disabled in some screen regions). For example, a different cell size might be used for the menu bar region of a typical operating system desktop screen display.

In a more aggressive adaptive implementation, metrics can be kept (in a memory in the frame buffer controller) of single pixel read/write frequency and average multiple pixel read/write spart lengths and frequencies. Based on these values, the frame buffer cell size and pixel encodings can be modified accordingly. Preferably, this would all be done transparently to the system software.

Next, we consider alternative embodiments of the invention for use with various conventional frame buffer memory technologies.

RAMBUS:

Although RAMBUS technology has excellent data bus width granularity, the octbyte data fetch granularity of the current RAMBUS implementation degrades the possible performance of CBC by effectively reducing cell compression by increasing the single pixel read/write cost. Furthermore, it may be difficult with RAMBUS technology to examine the tag bits of the incoming data stream quickly and effect quickly a termination of burst transfers (the 18M bit RDRAMs do support early termination of burst transfers).

Design of RAMBUS implementations of the invention will preferably take into account typical workload profiles and consider CBC efficacy in light of octbyte fetch granularity. An adaptive implementation as described above would likely substantially improve performance of a RAMBUS implementation of the invention.

It is important to note that a 1360×1024 pixel display (at 75 Hz) requires approximately 308M bytes/second (13.246 microseconds for 1360 dots) of refresh bandwidth if a refresh prefetch buffer is provided in the frame buffer controller which allows use of an entire horizontal time interval (including horizontal retrace) to obtain the display refresh data for a horizontal line (otherwise, a refresh bandwidth of approximately 391M bytes/s is needed). This leaves about 125M bytes/s for BLIT operations, and opens the possibility of an accelerated 1360×1024 (at 75 Hz) frame buffer using only a single RAMBUS rail if sufficient additional bandwidth can be freed using CBC to provide adequate BLIT performance.

SDRAM:

While conventional memories of the SDRAM type have excellent data fetch granularity, the data bus width granularity is coarser than provided by RDRAM technology because of its lower bandwidth. To support display refresh for a (1152×870) pixel×24 byte per pixel system (at 75 Hz) requires a refresh bandwidth of on the order of 237M bytes/s (14.5 microseconds total horizontal time for 1152 dots), assuming that a refresh prefetch buffer is provided in the frame buffer controller.

This means that an embodiment of the inventive system which includes a single pixel wide (3 byte wide) SDRAM interface running at 80 MHz could support an accelerated 21" 1152×870×24 display. The data bus width granularity in such a system would be 3 bytes, which is worse than the above-described RAMBUS bus width granularity of one byte, but the data fetch granularity of 3 bytes is considerably better than conventional RAMBUS octbyte data fetch granularity.

In designing such an embodiment of the invention, it is important to take into account the memory densities available.

If only 4M bit (512K×8) SDRAMs are available, six such SDRAMs are needed to implement a 3M byte embodiment of the above-described type, but it would then be preferable to make the frame buffer memory bus (bus 3 in FIG. 1) six bytes wide using conventional DRAMs to obtain the additional bandwidth needed.

If the system includes 8M bit SDRAMs (1M×8) (as would be ideal for a 1152×870 pixel display), three such SDRAM circuits would provide 24 bit bus width and adequate total memory capacity.

Use of 16M bit (1M×16) SDRAMs would likely be undesirable for implementing a 1152×870 pixel frame buffer (in some embodiments of the invention) as a minimum 4M byte frame buffer would be required, but would be very desirable for implementing a 1360×1024 pixel frame buffer (as described below with reference to FIGS. 15 and 16).

A frame buffer implemented with two 1M bit×16 SDRAMs might be ideally suited to a CBC implementation of a frame buffer that could drive a 1360×1024 display. Depending on how close to the theoretical maximum SDRAM input/output rate (100 MHz) such an embodiment of the inventive system could achieve, such a frame buffer could provide roughly 310–360M bytes/s of bandwidth, of which 308M bytes/s are need for worst case display refresh assuming the presence of a line buffer in the frame buffer controller. If 1360 pixels per horizontal line proves to require too much of a bandwidth from such a system, the system could alternatively by employed to support display of 1280 pixels per horizontal line.

DRAM:

The relatively low bandwidth of memories of the DRAM type results in large data bus width/granularity. To obtain 237M bytes/s of bandwidth would, as a practical matter, likely require a 6 byte wide (two pixel) interface between the frame buffer and the frame buffer controller. This limits use of the current generation of 4M bit DRAM circuits to embodiments of the invention for supporting an 1152×870 pixel display. As in RDRAM implementations of the invention, design of a DRAM implementation of the invention will preferably take into account workload profiles and consider CBC efficacy in light of the granularity of a 6 byte bus width. An adaptive implementation (of the type described above) would also probably prove beneficial in an embodiment of the invention employing a DRAM frame buffer.

It is quite possible that, in applications in which single pixel read and writes are not too frequent, a DRAM implementation of a true color frame buffer using CBC can be made to perform as well as a current VRAM frame buffer system for most images.

VRAM:

Generally, the above comments about DRAM implementations apply equally well to VRAM implementations of the invention.

Next, with reference to FIGS. 15 and 16, a preferred embodiment of the invention will be described for implementing lossless compression. This embodiment includes circuitry for compressing pixels each consisting of 3 bytes (8 bits per byte), and transferring the compressed (or uncompressed) pixels to a frame buffer over a bus having 32 bit width.

FIG. 15 is a block diagram of this preferred embodiment of the invention. The FIG. 15 system includes frame buffer controller 44, a frame buffer memory consisting of two fast narrow single ported memory chips 41 and 42, frame memory bus 43 (consisting of two 16-bit wide portions, each connecting one of memories 41 and 42 to controller 44), cache memory 45, and bus 46 connecting cache memory 45 to controller 44. Each of memories 41 and 42 is a 16 Megabit (1M×16 bit) SDRAM integrated circuit.

Frame buffer controller 44 can receive raw (uncompressed) digital color video data over system bus 5 from a host computer such as computer 1 of FIG. 1 (or from a video source controlled by a host computer), compress the video data, and transfer the compressed video over narrow bus 43 into frame buffer 41,42. Frame buffer controller 44 can also read compressed digital video from frame buffer 41,42, decompress the compressed digital video, and transfer the decompressed digital video to a RAMDAC (such as RAMDAC 6 of FIG. 1) for conversion to analog RGB video. The RAMDAC can then transfer the red (R), green (G), and blue (B) channels of analog RGB video to a display device (such as display device 8 of FIG. 1) for display. It is contemplated that such a RAMDAC can be integrated into controller 44, in which case the R, G, B, outputs of controller 44 would be analog signals.

When implementing a preferred lossless compression method, controller 44 stores tag bits in cache memory 45 (which can be an SRAM circuit) as it writes pixels into frame buffer memory 41,42. Each set of tag bits (consisting of one or more bits) contains information about each cell of the frame buffer memory. Use of such tag bits will be explained in greater detail below.

In typical operation, pixels of video data are encoded on system bus 5 in full precision format. Frame buffer controller 44 compresses the data on their way into frame buffer memory 41,42 for writes by the host computer. For reads by the host computer, frame buffer controller 44 decompresses the pixels of video data from frame buffer memory 41,42 on their way to the host computer over system bus 5.

For raster operations controlled by the FIG. 15 system, compressed pixels are read into frame buffer controller 44 from frame buffer memory 41,42, and the pixels are decompressed into full precision format in frame buffer controller 44. Pixels can also be compressed in frame buffer controller 44 as they are written into frame buffer memory 41,42.

Frame buffer controller 44 can have the same structure and basic method of operation as the frame buffer controller of FIG. 2, provided only that the structure is modified (in a manner that will be apparent to those of ordinary skill in the art from the following discussion) to write tag bits from compressor 20 over bus 46 to cache memory 45, and to supply tag bits read over bus 46 from memory 45 to either one of decompressors 14 and 26.

Each of memory circuits 41 and 42 is preferably a 1M×16 bit SDRAM integrated circuit. If circuits 41, 42, and 44 are clocked at 100 MHz, the FIG. 15 system can efficiently support a 1360×1024 pixel true color video display. If circuits 41, 42, and 44 are clocked at 80 MHz, the FIG. 15 system can efficiently support a 1280×1024 pixel true color video display.

Variations on the FIG. 15 circuit which include only one 1M×16 bit SDRAM circuit (41 or 42) can efficiently support an 832×624 pixel true color video display, since such a display requires a refresh bandwidth of 125M bytes/second (if controller 44 incorporates a line buffer, so that horizontal retrace time can be used), or 171M bytes/second (if controller 44 does not incorporate a line buffer). If the single 1M×16 bit SDRAM in such an embodiment operates at 100 MHz, there is enough bandwidth to support such a display whether or not controller 44 includes a line buffer, but if the single 1M×16 bit SDRAM operates at 80 MHz, there is enough bandwidth to support such a display only if controller 44 includes a line buffer. Because of the finer data bus width granularity of a single 16-bit pixel data interface (between controller 44 and the frame buffer), a greater effective compression can be achieved by variations of the FIG. 16 circuit in which the frame buffer consists of only one 1M×16 bit SDRAM chip.

Controller 44 preferably implements a lossless compression method, and is not constrained by encodings that fall on byte or nibble boundaries. We next describe a set of encodings for implementing such lossless compression, which include a reference pixel encoding in which each encoded reference pixel consists of a single tag bit (e.g., "0") identifying the pixel as a reference pixel followed by three 8-bit bytes which determine the value of the reference pixel. Primarily because the encoded reference pixel comprises 25 bits (rather than 24 bits or less), the FIG. 15 hardware is slightly more complex than that of FIG. 1, and includes an alignment stage to the pipeline.

The preferred lossless compression method writes pixels to cells of frame buffer memory 41,42, each cell consisting of 384 bits (48 bytes, each byte consisting of 8 bits). Thus, if controller 44 writes an anchor pixel (uncompressed, consisting of 24 bits) followed by a sequence of encoded reference pixels (also uncompressed, and consisting of 25 bits each) into a single cell, only the anchor pixel and fourteen of the reference pixels will fit into the cell. Thus, controller 44 should be programmed so that when it determines that a sequence of sixteen pixels to be written to the frame buffer cannot fit in a single cell of the frame buffer if encoded (because the compression algorithm specifies that they are all to be left uncompressed), it will not encode the pixels. Instead, controller 44 will write all sixteen of the pixels in unencoded, uncompressed form into one cell of the frame buffer. In this case, no tag bits are stored in the cell with the sixteen unencoded, uncompressed pixels. However, controller 44 will store one or more corresponding tag bits in cache memory 45 to identify the cell as one containing only unencoded, uncompressed data.

The need for storing such tag bits (to identify cells of unencoded pixel data in the frame buffer) is one reason for use of SRAM cache memory 45 in the FIG. 15 system. Another reason is the three cycle CAS (column address strobe) latency of typical 100 MHz SDRAM chips which are contemplated for implementing elements 41 and 42 of the frame buffer. This three cycle latency will be described with reference to FIG. 16.

Figures 16, 17:
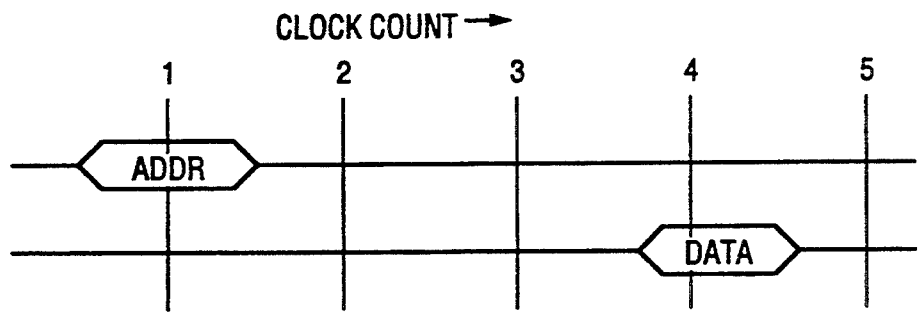
FIG. 16 is a diagram illustrating the three cycle CAS latency of preferred embodiments of frame buffer element 41 (or 42) in the FIG. 15 system.
FIG. 17 is a diagram for explaining a preferred pixel encoding scheme implemented by the frame buffer controller of FIG. 15.

As indicated in FIG. 16, there is a three cycle latency from the time a column address is clocked into a typical 100 MHz SDRAM chip (implementing element 41 or 42 of the frame buffer) until the data becomes available. The address is clocked into the SDRAM on clock 1, and the data becomes available just before clock 4. A minimum cell size is two fetches (assuming 32 bit wide bus 43 as shown in FIG. 15), so the last address for such a minimum cell would be clocked in on clock 2. But, since the earliest time that controller 44 could issue a new cell anchor pixel address (based on information contained in the current cell data) would be clock 5, two fetch cycles would be wasted (clocks 3 and 4), limiting the maximum cell compression from 6:1 to 3:1.

The FIG. 15 system employs fast cache memory 45 to circumvent this problem. Cache memory 45 is preferably a 64K×4 (or 32K×8) SRAM chip. Controller 44 stores two identification (tag) bits in cache memory 45 for each cell of the frame buffer 41,42 into which data have been written. Each pair of tag bits encodes the following information about the data in the corresponding frame buffer cell as follows: "00" indicates that the cell contains only unencoded, uncompressed pixel data; "01" indicates that a new anchor pixel address should be issued on clock 3; "10" indicates that a new anchor pixel address should be issued on clock 4; and "11" indicates the cell is compressed, but the cell fetch size field (discussed below) should be used to determine when to issue the next anchor pixel address.

Next, a preferred pixel encoding scheme implemented by the compressor element within controller 44 will be explained with reference to FIG. 17. FIG. 17 shows the format of a pixel encoded by each of seven different encoding types, and a three bit "cell fetch size" field inserted by controller 44 (in a stream of data to be written to the frame buffer memory) immediately after each anchor pixel. The FIG. 15 system preferably uses the FIG. 17 encodings to implement lossless compression of image data.

Since byte and nibble alignment is not critical in the described operating method of the FIG. 15 system, the preferred encoding scheme of FIG. 17 encodes pixels in Huffman fashion, with the most frequently occurring encoding types occurring in most scanned photographic or continuous tone images, having the smallest tags.

As in the alternative encoding scheme described above with reference to FIG. 4, the FIG. 17 scheme writes the first pixel in each cell as an untagged, uncompressed "anchor pixel." As indicated in FIG. 17, the anchor pixel consists of 24 bits (representing 8-bit red, green, and blue color components). The next three bits in each cell immediately after the anchor pixel) are a three bit "cell fetch size" field (represented at the bottom of FIG. 17).

The purpose of the three bit cell fetch size field is as follows. Since practical implementations of controller 44 may not respond fast enough to the tag bits of each encoded pixel of a data stream read from the frame buffer to terminate a burst read of a cell without wasting fetch cycles, the cell fetch size field provides an early indication of when to terminate the read. Controller 44 interprets the value of each cell fetch size field as an instruction to terminate a burst by issuing a new anchor pixel start address on clock 5, 6, 7, 8, 9, 10, 11, or 12 (i.e., on the fifth, sixth, ..., or twelfth clock cycle). Such use of the cell size field implies that data to be written into a cell cannot be streamed out to the frame buffer with low latency during a write, but must instead be held in a buffer within controller 44 until controller 44 determines the size (number of bits) of the complete stream of data to be written to the cell, and only thereafter written to the cell in the frame buffer. The use of such buffer within controller 44 (to assemble and hold the data to be written to each cell) implies that it is appropriate to use Run Length pixel encodings (in which a single encoding encodes multiple pixels) rather than a separate encoding for each repeated pixel.

With reference again to FIG. 17, it is expected that controller 44 will use the six tagged encoding types with decreasing frequency from top to bottom of FIG. 17. Thus, the most frequently used encoding type is to encode a pixel as a 24-bit uncompressed reference pixel (whose first bit is the tag bit "0"). The next most frequently used encoding type is to encode a pixel as a 14-bit compressed pixel whose first two bits are the tag "10", and whose next twelve bits are offset values which represent the difference between each color component of the pixel and the corresponding color component of the previous pixel (thus, the third through sixth bits of the compressed pixel determine a red offset value, the next four bits determine a green offset value, and the final four bits determine a blue offset value.

The next most frequently used encoding type is to encode a pixel as a 12-bit compressed pixel whose first three bits are the tag "110", and whose next nine bits are offset values which represent the difference between each color component of the pixel and the corresponding color component of the previous pixel (thus, the fourth through sixth bits of the compressed pixel determine a red offset value, the next three bits determine a green offset value, and the final three bits determine a blue offset value.

The next most frequently used encoding type is to encode a pixel as a 19-bit compressed pixel whose first four bits are the tag "1110", and whose next fifteen bits are offset values which represent the difference between each color component of the pixel and the corresponding color component of the previous pixel (thus, the fifth through ninth bits of the compressed pixel determine a red offset value, the next five bits determine a green offset value, and the final five bits determine a blue offset value.

The next most frequently used encoding type is to encode a pixel as an 11-bit compressed pixel whose first five bits are the tag "11110", and whose next six bits are offset values which represent the difference between each color component of the pixel and the corresponding color component of the previous pixel (thus, the sixth and seventh bits of the compressed pixel determine a red offset value, the next two bits determine a green offset value, and the final two bits determine a blue offset value.

The next encoding type is to encode a pixel as an 8-bit compressed pixel whose first five bits are the tag "11111". These tag bits indicate that the following number ("RUN LENGTH") of pixels (determined by the final three bits) have the same value as the previous pixel.

The Huffman coding assignments are based on data taken from typical scanned continuous tone or photographic images.

For typical desktops or word processing documents or spreadsheet documents, the run length encoding is the most frequently (by far) occurring encoding. But it is still acceptable to use the 5 bit tag field ("11111") for a run length encoded pixel (RLP) and allow multiple pixels (up to 8) to be encoded by a single RLP for two reasons:

1) since the entire cell must be buffered in the frame buffer controller to determine the cell fetch size field, it is straightforward to encode multiple identical pixels into a single RLP; and
2) it is important that if a cell consists exclusively of RLP encodings, it should fit into the minimum cell size. In the FIG. 15 system, the minimum size is 2 fetches, or 8 bytes. So there is sufficient room in such minimum size cell for an anchor pixel, cell fetch size bits, and 4 RLP's.

As in the embodiment described above with reference to FIGS. 4–12, when the frame buffer controller (controller 44 of FIG. 15) implements the FIG. 17 encoding scheme, its compressor determines the optimal one of the available encoding types to apply to each pixel to be written to the frame buffer. Each encoded pixel is written to a cell of the frame buffer with its tag bits (for example, with the tag "11110", in the case that the pixel differs only slightly from the preceding pixel, and thus has been encoded in the 11-bit "offset value" format shown in FIG. 17). The compressor also writes one of the above-described two-bit tags to cache memory 45 for each set of pixels written to a cell of the frame buffer (i.e., one two-bit tag is written to the cache memory for each cell of the frame buffer).

Various other modifications and alterations in the method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for compressing image data, wherein the image data comprise pixels of at least one frame of pixels, the method including the steps of:
   (a) receiving a set of N of the pixels, where N is an integer greater than one, and selecting one of the pixels in the set as an uncompressed anchor pixel;
   (b) generating compressed pixels by compressing N−1 others of the pixels in the set in accordance with one or more selected ones of at least two compression schemes, so as to reduce transmission bandwidth requirements for the compressed pixels; and
   (c) generating marked compressed pixels by marking each of the compressed pixels with a tag identifying the one of the compression schemes in accordance with which said each of the compressed pixels is compressed, wherein the anchor pixel and the marked compressed pixels together comprise a first group of N compressed pixels.

2. The method of claim 1, wherein the image data are video data.

3. The method of claim 1, wherein the image data are color video data, and each of the pixels includes three color components.

4. The method of claim 1, wherein the anchor pixel consists of twenty-four bits, and each of the compression schemes is a lossless compression scheme.

5. The method of claim 1, wherein step (a) includes the step of marking the anchor pixel with a first tag.

6. The method of claim 1, wherein the compressed pixels include a first compressed pixel compressed in accordance with a first one of the compression schemes, and a second compressed pixel compressed in accordance with a second one of the compression schemes.

7. The method of claim 1, wherein the compression schemes include:
   a full precision scheme in accordance with which no compression is performed, wherein each of the compressed pixels compressed in accordance with the full precision scheme is marked with said first tag; and
   an offset value compression scheme in accordance with which a compressed pixel's value is encoded as an offset value relative to the value of a reference pixel, where the reference pixel is the nearest preceding one of the compressed pixels that is marked with said first tag.

8. The method of claim 7, wherein the compression schemes also include:
   a run length pixel encoding scheme in accordance with which a number of compressed pixels having identical value to a preceding pixel is identified.

9. The method of claim 7, wherein the compression schemes also include:
   a second offset value compression scheme in accordance with which a compressed pixel's value is encoded as a limited range offset value relative to the value of a reference pixel, where the reference pixel is the nearest preceding one of the compressed pixels that is marked with said first tag.

10. The method of claim 9, wherein each of the pixels consists of P bits indicative of three different color components, each said offset value consists of Y bits of a first color component concatenated with Z bits of a second color component concatenated with Y bits of a third color component, and each said limited range offset value consists of Y' bits of the first color component concatenated with Z' bits of the second color component concatenated with Y' bits of the third color component.

11. The method of claim 10, wherein P=24, Y=4, Z=5, and Y'=Z'=2.

12. The method of claim 1, also including the step of:
   (d) repeating steps (a), (b), and (c) for a second set of N of the pixels to generate a second group of N compressed pixels, where none of the pixels in the second set was compressed or marked during a previous performance of steps (a), (b), and (c).

13. The method of claim 12, also including the step of:
   (e) storing the first group in a first cell of a memory, and storing the second group in a second cell of the memory, wherein each of the first cell and the second cell consists of M bits, where each of the set of N of the pixels and the second set of N of the pixels consists of P bits, where P is a number not greater than M.

14. The method of claim 13, wherein after step (e), each of the first cell and the second cell contains a sequence of bits beginning with bits of one said anchor pixel.

15. The method of claim 13, wherein M=P.

16. The method of claim 15, wherein each of the pixels consists of 24 bits, and M=24 R, where R is an integer.

17. The method of claim 13, wherein the memory is a fast, narrow, single ported memory.

18. The method of claim 17, wherein the step of storing the first group in the memory includes the step of transmitting said first group over a bus having a one pixel width, and the step of storing the second group the memory includes the step of transmitting said second group over said bus having a one pixel width.

19. The method of claim 17, wherein the step of storing the first group in the memory includes the step of transmitting said first group over a bus having a two pixel width, and the step of storing the second group the memory includes the step of transmitting said second group over said bus having a two pixel width.

20. A system for processing image data, including:
   compression means for compressing a stream of pixels of the image data by selecting one of the pixels to be an uncompressed anchor pixel of a set of N of the pixels, where N is an integer greater than one, generating compressed pixels by compressing N−1 others of the pixels in accordance with one or more selected ones of at least two compression schemes, so as to reduce transmission bandwidth requirements for the compressed pixels, and generating marked compressed pixels by marking each of the compressed pixels with a tag identifying the one of the compression schemes in accordance with which said each of the compressed pixels is compressed, wherein the anchor pixel and the marked compressed pixels together comprise a group of N compressed pixels; and
   bus interface means for writing the group of N compressed pixels, in burst fashion, to a narrow bus of a type capable of interfacing with a narrow single ported memory.

21. The system of claim 20, wherein the compression means is programmed to mark the anchor pixel with a first tag.

22. The system of claim 20, wherein the means for writing includes:
a write buffer memory connected for receiving said group of N compressed pixels from the compression means.

23. The system of claim 20, wherein the image data are video data.

24. The system of claim 20, wherein the image data are color video data, and each of the pixels includes three color components.

25. The system of claim 20, also including:
a narrow single ported memory; and
a narrow bus connected between the narrow single ported memory and the bus interface means.

26. The system of claim 20, also including:
means for controlling early termination of a write of said group of N compressed pixels to the narrow bus.

27. The system of claim 20, also including:
pixel buffer means for receiving a stream of compressed pixels of the image data from a bus;
decompression means for receiving the compressed pixels from the pixel buffer means and decompressing said compressed pixels to generate said stream of pixels, and supplying said stream of pixels to the compression means.

28. The system of claim 27, also including:
arithmetic logic means connected between the decompression means and the compression means for transforming said stream of pixels before supplying said stream of pixels to the compression means.

29. The system of claim 27, also including a display refresh means, said display refresh means including:
scanline buffer means for receiving said stream of compressed pixels of the image data from the bus; and
display refresh decompression means for receiving the compressed pixels from the scanline buffer means, and decompressing said compressed pixels to generate display pixels.

30. The system of claim 29, also including:
display means for receiving the display pixels from the display refresh decompression means, and converting said display pixels to analog form for display.

31. A system for processing image data, including:
a frame buffer controller;
a narrow single ported frame buffer memory; and
a narrow bus connected between the frame buffer controller with the narrow single ported frame buffer memory, wherein the frame buffer controller includes:
compression means for compressing pixels of the image data by selecting one of the pixels to be an uncompressed anchor pixel of a set of N of the pixels, where N is an integer greater than one, generating compressed pixels by compressing N−1 others of the pixels in accordance with one or more selected ones of at least two compression schemes, so as to reduce bandwidth requirements for transmitting the compressed pixels from the frame buffer controller over the narrow bus to the narrow single ported frame buffer memory, and generating marked compressed pixels by marking each of the compressed pixels with a tag identifying the one of the compression schemes in accordance with which said each of the compressed pixels is compressed, wherein the anchor pixel and the marked compressed pixels together comprise a group of N compressed pixels; and
bus interface means for writing the group of N compressed pixels, in burst fashion, to the narrow bus.

32. The system of claim 31, wherein the compression means is programmed to mark the anchor pixel with a first tag.

33. The system of claim 31, also including:
a system bus connected to the frame buffer controller; and
a host processor connected along the system bus.

34. The system of claim 31, wherein the frame buffer controller also includes a display refresh means, said display refresh means including:
buffer means for receiving compressed pixels of the image data from the narrow bus; and
display refresh decompression means for receiving the compressed pixels from the buffer means and decompressing said compressed pixels to generate display pixels.

35. The system of claim 34, also including:
display means for receiving the display pixels from the display refresh decompression means, and converting said display pixels to analog form for display.

36. The system of claim 31, wherein said compressed pixels include a first compressed pixel compressed in accordance with a first one of the compression schemes, and a second compressed pixel compressed in accordance with a second one of the compression schemes.

37. The system of claim 36, wherein the compression schemes include:
a full precision scheme in accordance with which no compression is performed, wherein each of the compressed pixels compressed in accordance with the full precision scheme is marked with said first tag; and
an offset value compression scheme in accordance with which a compressed pixel's value is encoded as an offset value relative to the value of a reference pixel, where the reference pixel is the nearest preceding one of the compressed pixels that is marked with said first tag.

38. The system of claim 37, wherein the compression schemes also include:
a run length pixel encoding scheme in accordance with which a number of compressed pixels having identical value to a preceding pixel is identified.

39. The system of claim 37, wherein the compression schemes also include:
a second offset value compression scheme in accordance with which a compressed pixel's value is encoded as a limited range offset value relative to the value of a reference pixel, where the reference pixel is the nearest preceding one of the compressed pixels that is marked with said first tag.

40. The system of claim 39, wherein each of the pixels consists of P bits indicative of three different color components, each said offset value consists of Y bits of a first color component concatenated with Z bits of a second color component concatenated with Y bits of a third color component, and each said limited range offset value consists of Y' bits of the first color component concatenated with Z' bits of the second color component concatenated with Y' bits of the third color component.

41. The system of claim 40, wherein $P=24$, $Y=4$, $Z=5$, and $Y'=Z'=2$.

42. A method for compressing pixels of image data, including the steps of:
  (a) receiving a set of N of the pixels, where N is an integer greater than one, and selecting one of the pixels in the set as an uncompressed anchor pixel;
  (b) generating compressed pixels by compressing N−1 others of the pixels in the set in accordance with a compression scheme by which each of said N−1 others of the pixels is compressed by a selected one of at least two lossless compression methods, to reduce transmission bandwidth requirements for the compressed pixels;
  (c) generating marked compressed pixels by applying a marking scheme to mark each of the compressed pixels with a tag identifying which of the lossless compression methods was employed to compress said each of the compressed pixels, where the anchor pixel and the marked compressed pixels together comprise a first group of N compressed pixels and the first group consists of P bits; and
  (d) storing the first group in a first cell of a frame buffer memory, and storing a cell tag in a first location of a cache memory, where the first location corresponds to the first cell, the first cell has capacity to store M bits, where M is an integer not less than P, and the cell tag consists of least one tag bit and characterizes the first group.

43. The method of claim 42, wherein the image data are color video data, and each of the pixels includes three color components.

44. The method of claim 42, also including the steps of:
  (e) storing a second set of Q of the pixels in a second cell of the frame buffer memory, said second cell having capacity to store M bits, without having compressed the second set, but after determining that a marked and compressed version of the second set would consist of more than M bits if each pixel of the marked and compressed version of the second set were compressed in accordance with the compression scheme and marked in accordance with the marking scheme; and
  (f) storing a second cell tag in a second location of the cache memory, where the second location corresponds to the second cell, and where the second cell tag consists of least one tag bit and characterizes the second set.

45. The method of claim 44, wherein the second cell tag indicates a cell containing uncompressed pixels that have not been compressed in accordance with the compression scheme.

46. The method of claim 42, wherein each of the anchor pixel and each of the pixels in the second set consists of twenty-four bits.

47. The method of claim 46, wherein Q=16, and M=384.

48. The method of claim 47, wherein step (d) includes the step of transferring the first group to the frame buffer memory over a bus having sixteen-bit width, and step (e) includes the step of transferring the second set to the frame buffer memory over said bus having sixteen-bit width.

49. A system for compressing pixels of image data, said system including:
  means for receiving a set of N of the pixels, where N is an integer greater than one;
  compression means for selecting one of the pixels in the set as an uncompressed anchor pixel, for generating compressed pixels by compressing N−1 others of the pixels in the set in accordance with a compression scheme by which each of said N−1 others of the pixels is compressed by a selected one of at least two lossless compression methods, to reduce transmission bandwidth requirements for the compressed pixels, and for generating marked compressed pixels by applying a marking scheme to mark each of the compressed pixels with a tag identifying which of the lossless compression methods was employed to compress said each of the compressed pixels, where the anchor pixel and the marked compressed pixels together comprise a first group of N compressed pixels and the first group consists of P bits;
  a frame buffer memory connected to the compression means; and
  a cache memory connected to the compression means, and wherein said compression means also includes:
  means for storing the first group in a first cell of the frame buffer memory, and storing a cell tag in a first location of the cache memory, where the first location corresponds to the first cell, the first cell has capacity to store M bits, where M is an integer not less than P, and the cell tag consists of least one tag bit and characterizes the first group.

50. The system of claim 49, wherein the compression means also includes:
  means for storing a second set of Q of the pixels in a second cell of the frame buffer memory, said second cell having capacity to store M bits, without having compressed the second set, but after determining that a marked and compressed version of the second set would consist of more than M bits if each pixel of the marked and compressed version of the second set were compressed in accordance with the compression scheme and marked in accordance with the marking scheme; and
  means for storing a second cell tag in a second location of the cache memory, where the second location corresponds to the second cell, and where the second cell tag consists of least one tag bit and characterizes the second set.

* * * * *